Oct. 18, 1927.
W. H. BARNES
MOTOR VEHICLE
Filed Nov. 20, 1922
1,646,131
2 Sheets-Sheet 1
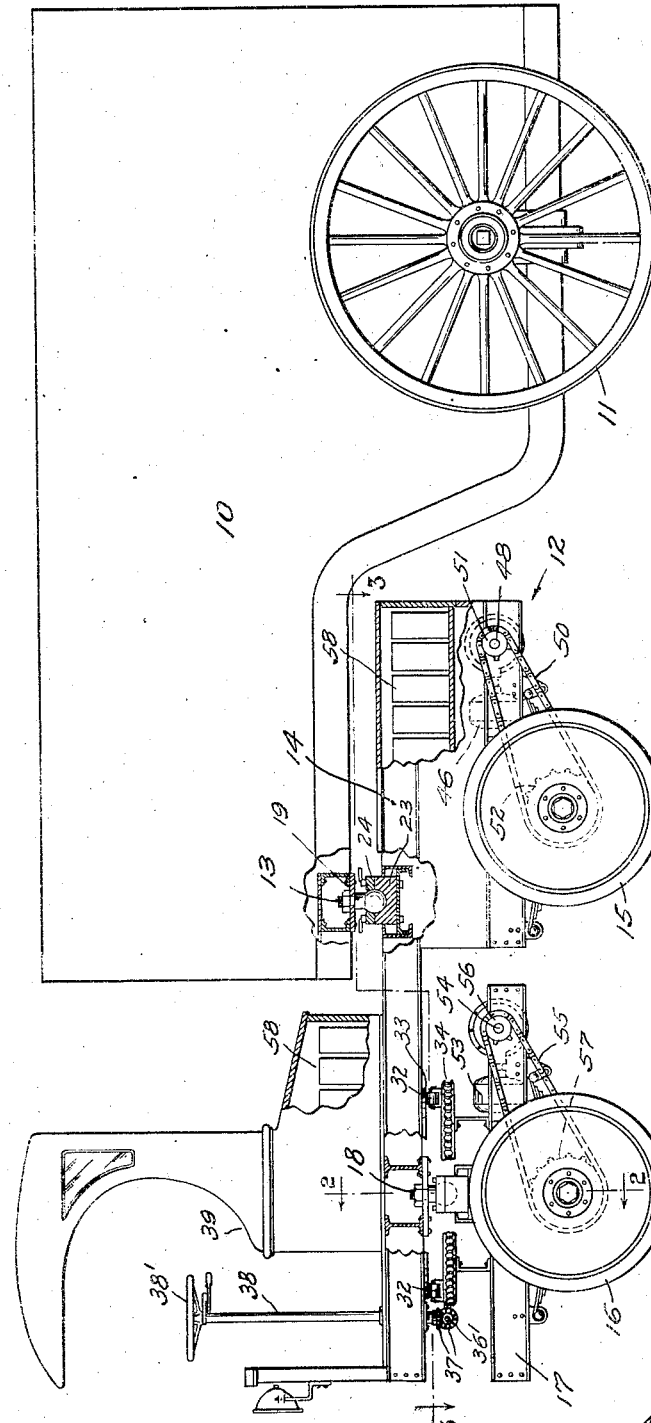
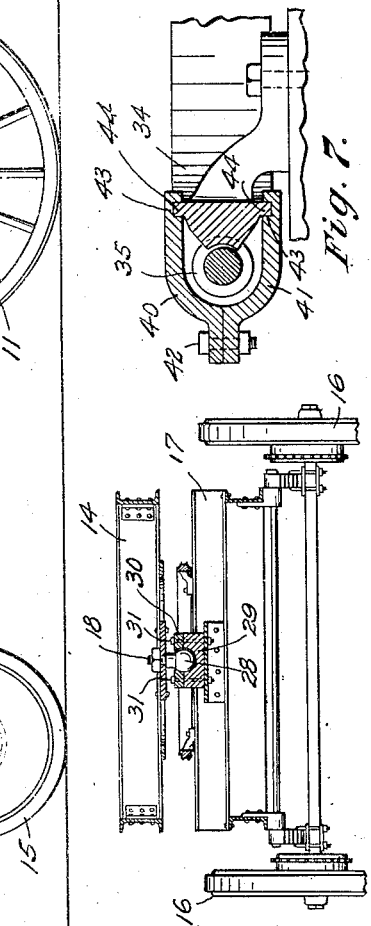
INVENTOR
William H. Barnes
BY
Pierre Barnes
ATTORNEY

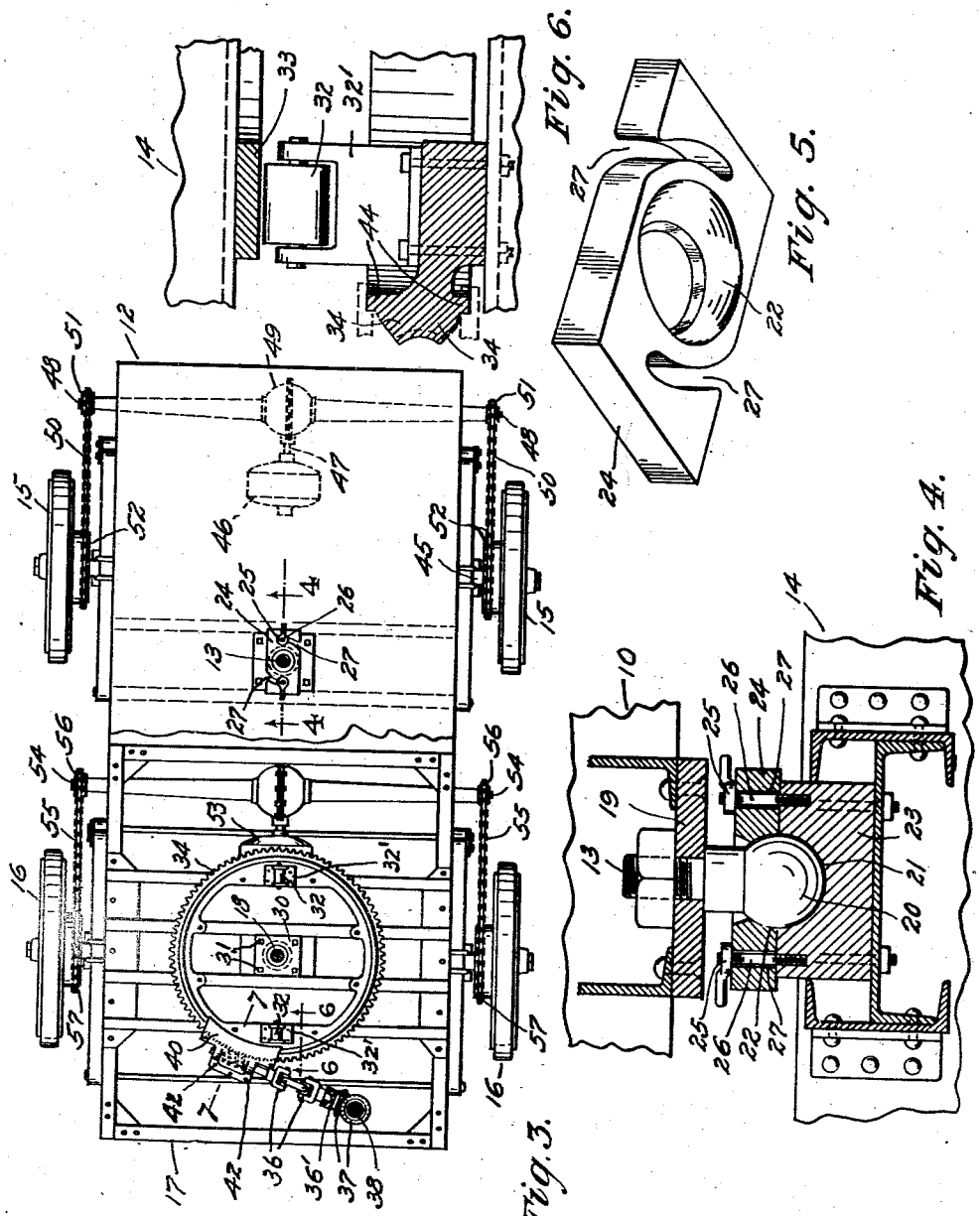

Patented Oct. 18, 1927.

1,646,131

UNITED STATES PATENT OFFICE.

WILLIAM H. BARNES, OF SEATTLE, WASHINGTON; CORNELIA BARNES EXECUTRIX OF SAID WILLIAM HARRISON BARNES, DECEASED.

MOTOR VEHICLE.

Application filed November 20, 1922. Serial No. 601,977.

The object of my invention is the provision of an efficient and conveniently controlled motor vehicle which is designed more especially for hauling a dray or van and which may be detachably connected thereto.

Other objects and advantages of the invention will appear in the following description.

The invention consists in the novel construction, arrangement and combination of parts hereinafter described and claimed.

In the accompanying drawings:

Figure 1 is a side elevation, partly in section, of an embodiment of my invention. Figs. 2 and 3 are sectional views through 2—2 and 3—3 of Fig. 1. Fig. 4 is a detail sectional view through 4—4 of Fig. 3. Fig. 5 is a perspective view of the coupling plate shown in Figs. 1 and 3. Figs. 6 and 7 are detail sectional views through 6—6 and 7—7 of Fig. 3.

Referring to Fig. 1 of the drawings, 10 represents the body of a trailer, whose rear end is supported by road wheels, such as 11, and its front end is supported by a vehicle 12 over which the trailer extends and is pivotally connected thereto by a king pin 13. The chassis 14 of said vehicle is provided with rear traction wheels 15 and its front wheels 16 constitute a part of a truck having a frame 17 which is pivotally connected to said chassis by means of a king pin 18. As best shown in Fig. 4, the king pin 13 is secured to and depends from the frame member 19 of the trailer floor and is provided with a globular lower extremity 20 which fits within complementary sockets 21 and 22 provided respectively in a block 23 rigid with the chassis structure and a coupling plate 24. This plate is detachably connected to said block by means of clamping nuts 25 engaging stud bolts 26 which are secured to the block and extend upwardly through arcuate slots 27 (Fig. 3 and 5) provided in the plate 24, said slots being arranged to extend from opposite sides of the latter and concentric of the axis of socket 22. By loosening the nuts 25 and suitably rotating the plate 24 to withdraw the same from the bolts 26, the pin 13 is disconnected from said vehicle to allow the removal of the same from the trailer.

The pin 18 depends from the chassis 14 and has a globular lower end 28 (Fig. 2) engaging in complementary sockets provided in a block element 29 of the truck frame and a collar 30 which is secured upon the block 29 as by means of bolts 31.

The ball-and-socket connections, above explained, enable the vehicle and the truck member thereof to accommodate themselves to irregularities in the slopes or grades of a road surface.

In order, however, to obviate any longitudinal oscillatory movements of the truck I provide upon the latter rollers 32 tracking against a metal ring 33 which is secured to the underside of the vehicle chassis, said rollers being mounted in chairs $32^1$, see Figs. 3 and 6, which are located in axial alignment with each other and in the longitudinal axis of the truck.

The vehicle is steered by rotating the truck member horizontally about the axis of the king pin 18. To which end I provide concentrically of such pin axis upon the truck a worm wheel 34 which is operated by a worm 35 through the medium of a flexible shaft—or, as shown, by means of universal couplings 36 and a shaft $36^1$—and bevel gear wheels 37 with a steering post 38 provided on the vehicle and having a steering wheel $38^1$ which is located within convenient reach of the operator's seat 39.

The worm 35 is mounted in a housing comprising two complementary parts 40 and 41, Fig. 7 which are coupled together as by means of bolts 42 and are slidably connected to the worm wheel for revoluble movements relative to the wheel axis by the provision of arcuate guiding grooves 43 provided in the housing parts cooperating with circular ridges 44 provided on the upper and underside respectively of the wheel 34.

The ground wheels 15 for the vehicle chassis are journaled on an axle 45 provided therefor and are driven by means of a motor 46 which is mounted upon such chassis.

As illustrated, motion is transmitted from said motor to the associated wheels 15 through the medium of a propeller shaft 47, a two-part transversely arranged shaft, indicated by 48 in Fig. 3, provided in a casing 49 containing differential gearing (not shown) of known or suitable construction, and endless chains 50 extending about sprocket wheels 51 and 52 on the shaft parts 48 and the respective wheels 15.

In like manner, the ground wheels 16 of the truck are driven from a motor 53, which is mounted upon the truck, through the medium of shaft elements 54, endless chains 55 and sprocket wheels 56 and 57 arranged as shown in Figs. 1 and 3. The motors above referred to are desirably of the electric type and are connected by circuit wires (not shown) with storage batteries denoted by 58 provided on the vehicle.

From the foregoing description, it will be seen that the vehicle is conveniently detachable from the trailer which is to be drawn and may be used separately or interchangeably with a plurality of the latter.

In operation, the ground wheels 16 of the truck may be driven independently of or simultaneously with the other ground wheels 15 of the vehicle by means of the respective motors.

What I claim, is,—

1. In a vehicle, a truck rotatably connected to the vehicle-frame, a worm wheel secured to said truck concentric to the axis of rotation thereof and provided with vertically spaced circumferential ribs, a worm, a housing for said worm, said housing being provided with grooves for slidably engaging the ribs of said worm-wheel for relative revoluble movements and serving to maintain the worm in mesh with the worm-wheel, a steering wheel, a post therefor provided on the vehicle-frame, and operative connections including a flexible shaft between said post and the worm.

2. In a four-wheeled vehicle, a truck rotatably and tiltably connected to the vehicle-frame at the front portion thereof, a pair of rollers provided on said truck in the longitudinal axis thereof, a circular track provided on the underside of the vehicle-frame for said rollers, a worm wheel provided on said truck, said wheel being provided with ribs disposed concentrically of the axis thereof, a worm, a housing for said worm, said housing having grooves engageable with said ribs for maintaining the worm in mesh with the worm wheel, a steering post and an operating wheel therefor provided on said vehicle frame, and operative connections between said post and the worm to effect the turning of the truck to steer the vehicle.

3. In a vehicle, a truck rotatably and tiltably connected to the vehicle-frame at the forward portion thereof, a pair of rollers provided on said truck in the longitudinal axis thereof, a circular track provided on the underside of the vehicle-frame for said rollers, a worm wheel provided on said truck, said wheel being provided with parallel ribs disposed concentrically of the axis thereof, a worm, a housing for said worm, said housing having parallel grooves slidably engaging said ribs for maintaining the worm in mesh with the worm wheel, a steering post and an operating wheel therefor provided on said vehicle-frame, and steering connections between said post and the worm, said connections comprising a shaft secured to said worm, a second shaft, universal couplings between said shafts, and bevel gear connection between the second named shaft and said post.

4. In a vehicle, a frame, a truck having both rotary and lateral oscillatory movements relative to the vehicle frame, a circular track provided on the underside of the vehicle frame, rollers carried by the truck and engaging said track, said rollers having their axes parallel with and disposed in the longitudinal axis of the truck for permitting such lateral oscillatory movements, and means to rotate the truck about its axis of rotation for steering the vehicle, said last named means including flexible steering connections to permit the oscillatory movement of the truck.

Signed at Seattle, Washington, this 8th day of November, 1922.

WILLIAM H. BARNES.